United States Patent [19]

Libby, Jr. et al.

[11] Patent Number: 4,497,996
[45] Date of Patent: Feb. 5, 1985

[54] ARC WELDING SYSTEM WITH VISION

[75] Inventors: Charles J. Libby, Jr., West Roxbury; Barry Gaiman, Bedford, both of Mass.

[73] Assignee: Automatix Incorporated, Billerica, Mass.

[21] Appl. No.: 459,019

[22] Filed: Jan. 18, 1983

[51] Int. Cl.³ ............................................. B23K 9/12
[52] U.S. Cl. ............................. 219/124.34; 318/577; 901/42; 901/47
[58] Field of Search ..................... 219/124.34, 124.22; 356/376, 377; 318/577; 901/42, 47

[56] References Cited

U.S. PATENT DOCUMENTS

| | | | |
|---|---|---|---|
| 3,757,125 | 9/1973 | Okada et al. | 219/124.34 |
| 3,976,382 | 8/1976 | Westby | 356/376 |
| 4,380,696 | 4/1983 | Masaki | 219/124.34 |
| 4,417,127 | 11/1983 | Nachev et al. | 219/124.34 |

FOREIGN PATENT DOCUMENTS 616076  7/1978  U.S.S.R. .................. 219/124.34

*Primary Examiner*—Clifford C. Shaw

*Attorney, Agent, or Firm*—Richard J. Birch

[57] ABSTRACT

An arc welding system with image acquisition utilizing a non-planar beam of electro-magnetic radiation, such as, a hollow conical beam of light, to illuminate at least a portion of the welding object is disclosed. The conical beam of light is generated by impinging a light beam on the surface of a concave, cylindrical reflector having a longitudinal axis that preferably is parallel to the longitudinal axis of the welding torch. The light beam enters the concave cylindrical reflector through the hollow shaft of a motor. Rotation of the motor angularly positions the reflected light beam on the welding object. The illuminated portion of the object is imaged on an array of photosensitive elements to produce corresponding signals that are representative of the image on the array. These signals are used to obtain identification information concerning the welding object and guidance information for a plural axis manipulator that guides the welding torch tool along a welding seam. The image acquisition apparatus is optically and physically shielded from the welding arc by a replaceable shield.

10 Claims, 5 Drawing Figures

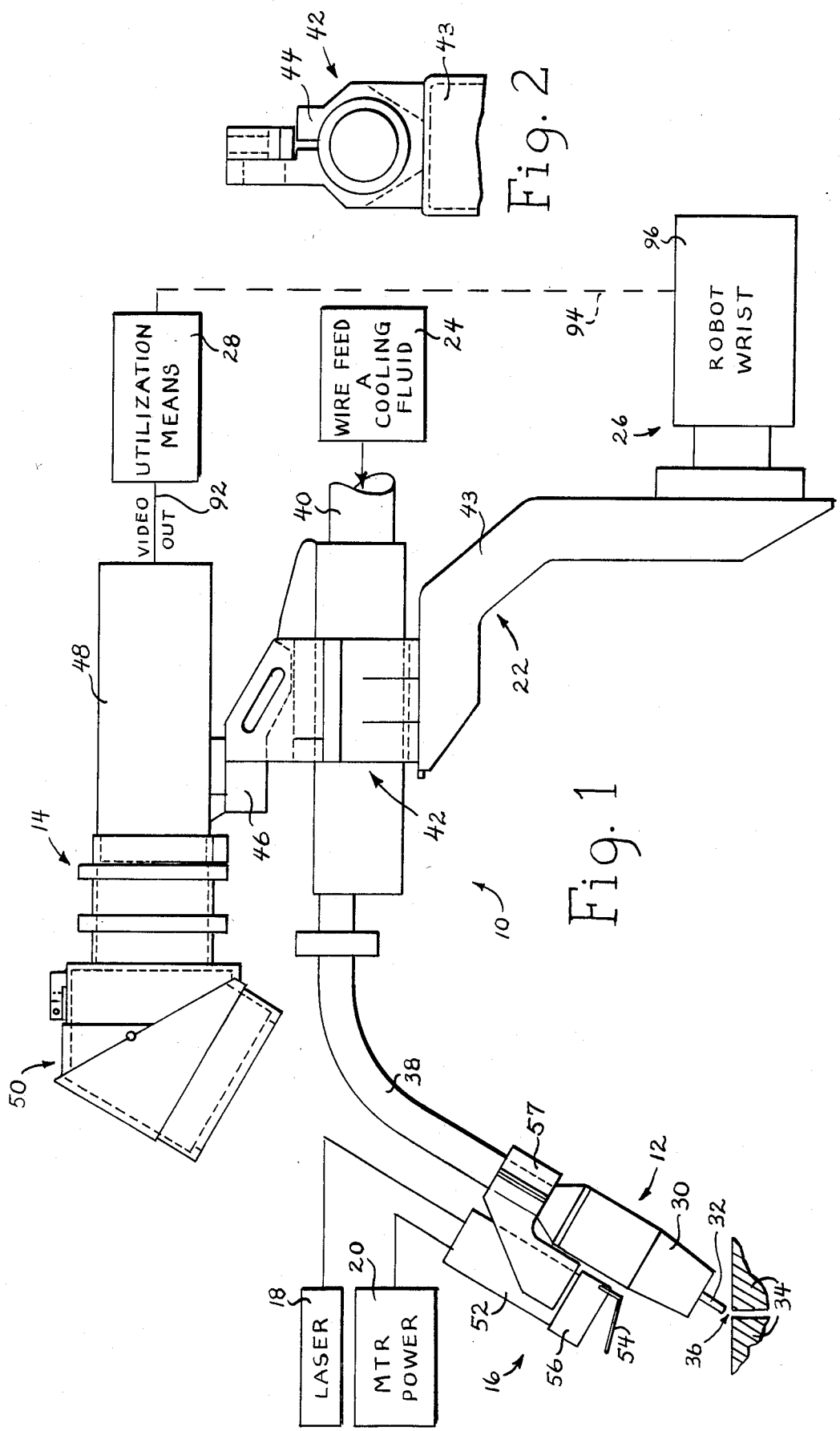

ARC WELDING SYSTEM WITH VISION

CROSS-REFERENCE TO RELATED APPLICATIONS

The present application relates to the following applications of Charles J. Libby, Jr.: Ser. No. 352,597, filed Feb. 26, 1982 for Method and Apparatus For Image Acquisition and Ser. No. 458,932 now U.S. Pat. No. 4,409,478 for Method and Apparatus For Image Acquisition Utilizing A Concave, Cylindrical Reflector and Ser. No. 458,836 now U.S. Pat. No. 4,413,180 for Method and Apparatus For Image Acquisition Utilizing A Hollow Shaft Motor And A Concave Cylindrical Reflector, both of which are filed simultaneously herewith.

BACKGROUND OF THE INVENTION

The present invention relates to arc welding systems in general and, more particularly, to an arc welding system with image acquisition.

Recent developments in the robotics industry have highlighted the need for accurate vision systems not only for parts identification, but also for robot guidance. U.S. Pat. No. 4,105,925, is an example of an optical object locator which determines the position and orientation of parts on a moving conveyor through the use of two planes of light that intersect at a single transverse line on the conveyor circuit. The two planes of light are located at an acute angle with respect to the conveyor. A linear diode array is aligned with the single line of light on the conveyor. When a part or other object on the conveyor moves through the line of light, it intercepts the light above the coneyor at positions spaced laterally from the line of light. The linear diode array senses only the line segments on the conveyor located beyond the object or part boundaries. Through the use of electronic sampling of the illumination on linear array, the object or part boundaries are determined and the part shape and orientation are thereby detected.

Automated arc-welding or seam welding is a recent and expanding addition to the manufacturing process, particularly in the automotive industry. Although the quality and consistency of the finished weld is high, difficulties inherent in the process have to be addressed in the design of a robotic system. Arc-welding is often one of the last in a series of manufacturing steps, each of which may contribute tolerance errors to piece parts. Furthermore, the welding process itself introduces thermal stresses and deformations in the weldment. Typically, the repeated presentation of parts to be welded is accomplished by fixturing or tooling which fixes in space the components to be joined. The accuracy of this positioning will influence the final tolerance of the weldment.

A skilled human welder will adapt his welding to accomodate the vagaries of weldment seam position and fit-up. However, there exists few effective mechanisms in automated welding to accomplish these ends. It is estimated that at least thirty percent of the welding tasks otherwise appropriate for robot welding do not meet the minimum criteria for accuracy in dimensionality, part fit-up or fixture positioning.

In order to achieve the maximum benefits from robotic arc welding, the welding apparatus should be able to determine the geometry and location of the weld seam in the presence of the welding arc by mens of a suitable vision sensor. Given this information, adjustments then can be made to position accurately the welding torch and thus, accomodate inaccuracies in the weldment.

It is accordingly, a general object of the present invention to provide an arc welding system with image acquisition.

It is a specific object of the invention to provide an arc welding system with image acquisition which utilizes a non-planar beam of light to illuminate a portion of the welding object which portion is thereafter imaged on a detector to produce corresponding signals representative of the image thereon.

It is another specific object of the invention to provide an arc welding system with image acquisition in which the non-planar beam of electro-magnetic radiation takes the form of a hollow conical beam of light that is generated by means of a concave, cylindrical reflector.

It is still another object of the invention that the image acquisition apparatus is used in conjunction with a plural axis manipulator to provide guidance and identification information for controlling the welding torch.

It is a further object of the invention to provide an arc welding system with image acquisition in which the image acquisition apparatus is optically and physically shielded from the arc of the welding torch.

It is a feature of the invention that the image acquisition apparatus shield is easily replaceable and at a very modest cost.

It is another feature of the invention that the method thereof can be practiced with relatively conventional electro-optical components.

BRIEF DESCRIPTION OF THE DRAWINGS

The above objects and features of the invention will best be understood from a detailed description of a preferred embodiment thereof, selected for purposes of illustration, and shown in the accompanying drawings in which:

FIG. 1 is a view in side elevation and partial block form showing the arc welding system with image acquisition of the present invention;

FIG. 2 is a front view showing a portion of the welding torch and camera mounting bracket;

DETAILED DESCRIPTION OF THE INVENTION

Figure 3:
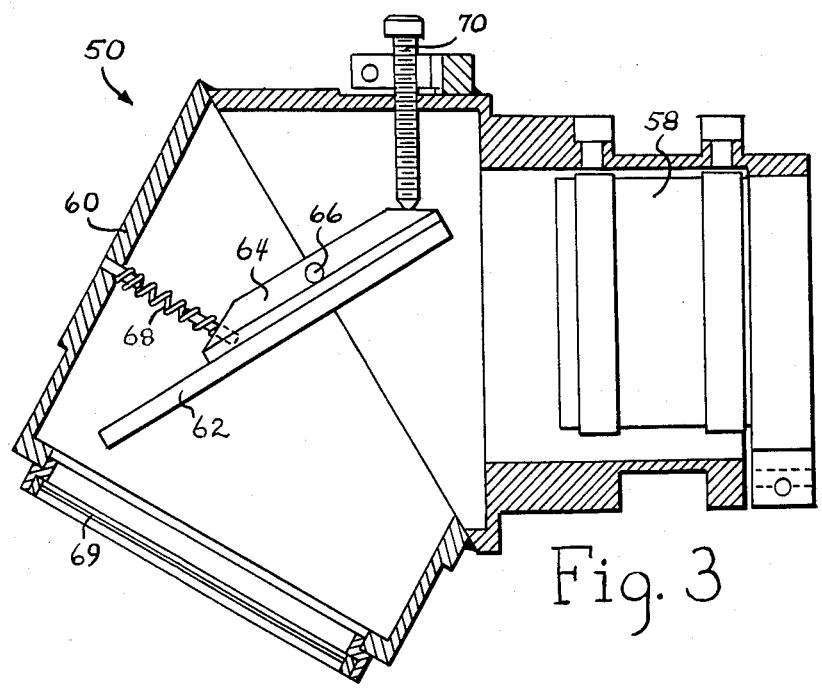
FIG. 3 is an enlarged view in partial cross-section showing the camera mirror assembly of FIG. 1.

Turning now to the drawings, and particularly to FIG. 1 thereof, there is shown in side elevation and partial block form an arc welding system with image acquisition constructed in accordance with the present invention and indicated generally by the reference number 10. The arc welding system 10 comprises the following major components: an arc welding torch assembly 12; a camera/mirror assembly 14; a welding vision assembly 16; a laser 18; a source 20 of electrical power for the welding vision assembly; a torch and camera mounting assembly 22; a source 24 for welding wire feed and cooling fluid; and, a utilization means 28. Each of these major components will be discussed below in detail.

The arc welding torch assembly 12 has a conventional torch nozzle 30 from which extends a welding wire 32. The welding wire and cooling fluid for the torch nozzle 30 are provided by source 24. The welding torch, wire feed and cooling fluid supply are standard, well known components of an arc welding system and need not be described in any detail. The welding items are shown in partial cross section in FIG. 1 and indicated by the reference numeral 34. A welding arc 36 is drawn in a conventional manner to weld objects 34 together. The torch assembly 12 is connected to the wire feed and cooling fluid source 24 by means of an arcuate pipe 38 and conduit 40.

Support for the welding torch assembly is provided by the previously mentioned torch and camera mounting assembly 22. Referring to FIGS. 1 and 2, a mounting clamp, indicated generally by the reference numeral 42, is secured to bracket 43 of the torch and camera mounting assembly 22. The mounting clamp includes an annular compression clamp 44 that adjustably clamps the torch assembly conduit 40 to establish the initial longitudinal and rotational position thereof.

Mounting clamp 42 also has a camera mounting bracket 46 to which is mounted a camera 48 such as, a charged coupled device (CCD) camera. A mirror assembly 50, shown in greater detail in FIG. 3, directs the field of view of camera 48 and will be discussed below.

The welding vision assembly 16 comprises a housing 52, a spatter shield 54 and a spatter shield mounting end cap 56. The assembly is mounted on and secured with respect to the torch conduit 38 by means of a suitable clamp 57.

Referring now to FIG. 3, the mirror assembly 50 directs the field of view for camera lens 58. The mirror assembly 50 has a housing 60 within which is mounted an elliptical field of view of directing mirror 62. Elliptical mirror 62 is pivotally mounted by means of mirror mount 64 and pivot pin 66 and spring-loaded by means of spring 68. The position of mirror 62 is controlled by threaded adjusting screw 70. If desired, one or more filters 69 can be mounted on the mirror assembly 50 to control the light spectrum impinging upon the camera lens 58.

Figure 4:
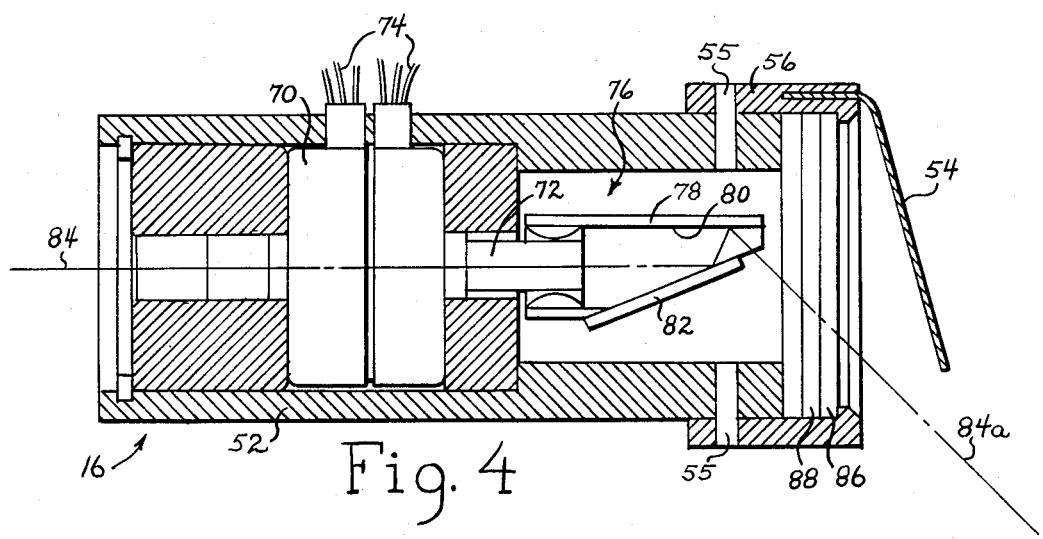
FIG. 4 is an enlarged view in partial cross-section showing the hollow, conical beam generation assembly and the spatter shield; and, FIG. 5 is an enlarged view in perspective of the spatter shield and mounting end cap for the hollow, conical beam generation assembly.

Referring now to FIG. 4, there is shown in enlarged view the welding vision assembly 16 which is used to generate the previously mentioned hollow conical beam of light that illuminates at least a portion of the welding object. A detailed description of the purpose and use of this non-planar beam of light in an image acquisition system is contained in the previously mentioned applications of Charles J. Libby, Jr., which are incorporated herein by reference. For purposes of this application, it is sufficient to understand that the arcuate beam generated by the welding vision assembly 16 illuminates at least a portion of the welding object and that at least a portion of the illuminated welding object is imaged by the CCD camera 48 to produce video output signals representing the image. Use of these signals is made by utilization means 28 and one example of such a use will be described below.

The welding vision assembly 16 has a annular housing 52 within which is mounted an electrical motor 70 having a hollow shaft 72. Electrical power for motor 70 is obtained from motor power source 20 (FIG. 1) through connecting wires 74. A rotatable optical pointing and spreading assembly, indicated generally by the reference numeral 76, is mounted on and rotatable with the hollow shaft 72 of motor 70. The optical pointing and spreading assembly 76 comprises a cylindrical reflector 78 having a concave reflecting surface 80 and a beam directing mirror 82.

Light from laser 18 passes through the hollow shaft 72 of the motor as indicated by light path 84. After passing through the hollow motor shaft, the laser light is reflected from beam directing mirror 82 to the concave reflecting surface 80 of the cylindrical reflector 78. The beam reflected off of the concave surface 80 constitutes a portion 84a of a hollow, conical beam having an arcuate length that is a function of the beam width of the laser beam impinging on the concave reflective surface and the radius of the surface. The term "conical beam" as used herein means a beam having the general shape of the surface of a cone, i.e., a hollow cone. This beam configuration can be compared to the structural shape of the cone portion of an ice cream cone.

Rotation of the optical pointing and spreading assembly 76 sweeps the arcuate beam portion 84a around the longitudinal axis of the welding vision assembly 16. The angular degree of beam sweep is controlled by limiting the angular rotation of the hollow motor shaft 72.

Preferably, the welding vision assembly 16 has a protective glass cover plate 86. If desired, one or more filters 88 can be mounted within and held by the end cap 56.

Figure 5:
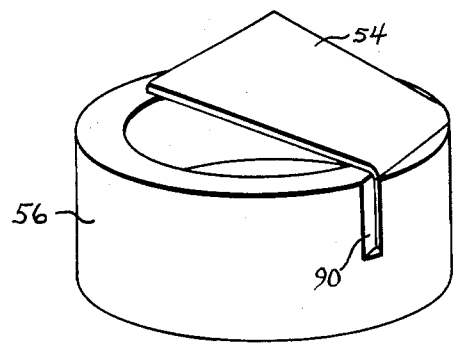

FIG. 5 illustrates in perspective view the welding vision assembly spatter shield 54 and its end cap 56 that is fitted over the bottom of the assembly as shown in FIG. 4. The spatter shield 54 is removably mounted on end cap 56 by frictional engagement of the L-shaped spatter shield with the walls of a notch 90 cut in end cap 56. The purpose of the removably spatter shield 54 is to both optically and physically shield the welding torch arc 36 from the welding vision assembly 16.

The spatter shield 54 is subject to repeated and significant physical damage resulting from the welding process. Therefore, it is desirable to removably mount the spatter shield 54 on end cap 56. One convenient way of removably mounting the spatter shield is by means of the previously described friction fit between the spatter shield 54 and the walls of slot 90. However, it will be appreciated that other removable mounting methods can be employed to mount spatter shield 54 on the end cap. In addition, the end cap itself is removable by rotating cap so that it disengages from bayonet mounting pins 55. A variety of materials can be used to construct the protective spatter shield 54. Brass or, preferably, stainless steel stock are representative examples of such materials. At least the upper, i.e., welding vision assembly facing surface of the spatter shield, is finished with a black oxide to effectively eliminate any reflections from the shield. Furthermore, the size and shape of the spatter shield can be varied to accommodate different weld seam configuration.

It will be appreciated from an inspection of FIGS. 1 and 4 that the spatter shield 54 optically and physically protects the welding vision assembly 16 from the welding arc 36 while allowing the exit of welding object illuminating beam 84a from the welding vision assembly 16.

The illuminated portion of the welding object is imaged by camera 48 to produce video output signals on line 92 as previously mentioned. The video signals are used by the utilization means 28. One such use is the control of the plural axis manipulator 26. The utilization means produces control signals indicated by the dashed line 94 to control the movement of robot wrist 96 of the plural axis manipulator 26. This configuration permits the welding torch 30 to "track" the welding seam of welding objects 34.

Having described in detail a preferred embodiment of our invention, it will now be obvious to those skilled in the art that numerous modifications can be made therein without departing from the scope of the invention as defined in the following claims.

What we claim and desire to secure by Letters Patent of the United States is:

1. An arc welding apparatus comprising:
   A. a movable arc welding torch means;
   B. a conical beam generating apparatus comprising:
      (1) means for generating a beam of collimated light;
      (2) a rotatable reflective cylinder means having a concave reflective surface;
      (3) means for rotating said reflective cylinder means;
      (4) beam directing mirror means secured with respect to and rotatable with said rotatable reflective cylinder means for directing said beam of collimated light to said reflective surface to produce a conical beam of light having an angular arc that (i) is a function of the radius of the concave reflective surface and the width of the collimated light beam impinging thereon and (ii) illuminates at least a portion of the object to be welded, said conical beam generating apparatus being positioned with respect to and movable with said movable arc welding torch means;
   C. means for optically and physically shielding said beam generating apparatus from the welding arc created by said movable arc welding torch means during welding of the object;
   D. means for imaging at least part of the light beam illuminated portion of the object to be welded on an array of photosensitive elements to produce corresponding signals; and,
   E. utilization means responsive to said signals for controlling the movement of said movable arc welding torch means.

2. The apparatus of claim 1 wherein the longitudinal axis of said movable arc welding torch means and said reflective cylinder means are substantially parallel.

3. The apparatus of claim 1 wherein said utilization means produces control signals and further comprising plural axis manipulator means responsive to said control signals for manipulating said movable arc welding torch means and said conical beam generating apparatus.

4. An arc welding apparatus comprising:
   A. a movable arc welding torch means;
   B. a conical beam generating apparatus comprising:
      (1) means for generating a beam of collimated light;
      (2) a reflective cylinder means having a concave reflective surface;
      (3) motor means having a hollow, rotatable motor shaft;
      (4) beam directing mirror means secured with respect to and rotatable with said hollow rotatable motor shaft for directing said beam of collimated light that passes through said hollow, rotatable motor shaft to said concave reflective surface to produce a conical beam of light having an angular arc that (i) is a function of the radius of the concave reflective surface and the width of the collimated light beam impinging thereon and (ii) illuminates at least a portion of the object to be welded, said conical beam generating apparatus being positioned with respect to and movable with said movable arc welding torch means;
   C. means for optically and physically shielding said beam generating apparatus from the welding arc created by said movable arc welding torch means during welding of the object;
   D. means for imaging at least part of the light beam illuminated portion of the object to be welded on an array of photosensitive elements to produce corresponding signals; and,
   E. utilization means responsive to said signals for controlling the movement of said movable arc welding torch means.

5. The apparatus of claim 4 wherein the longitudinal axis of said movable arc welding torch means and said reflective cylinder means are substantially parallel.

6. The apparatus of claim 4 wherein said utilization means produces control signals and further comprising plural axis manipulator means responsive to said control signals for manipulating said movable arc welding torch means and said conical beam generating apparatus.

7. An arc welding apparatus comprising:
   A. a movable arc welding torch means;
   B. a conical beam generating apparatus comprising:
      (1) means for generating a beam of collimated light;
      (2) a rotatable reflective cylinder means having a concave reflective surface;
      (3) means for rotating said reflective cylinder means;
      (4) beam directing mirror means secured with respect to and rotatable with said rotatable reflective cylinder means for directing said beam of collimated light to said concave reflective surface to produce a conical beam of light having an angular arc that (i) is a function of the radius of the concave reflective surface and the width of the collimated light beam impinging thereon and (ii) illuminates at least a portion of the object to be welded;
   C. mounting means for securing said conical beam generating apparatus with respect to said movable arc welding torch means so that the conical beam generating apparatus moves with the movable arc welding torch means;
   D. a replaceable shield means for optically and physically shielding said beam generating apparatus from the welding arc created by said movable arc welding torch means during welding of the object;
   E. means for imaging at least part of the light beam illuminated portion of the object to be welded on an array of photosensitive elements to produce corresponding signals; and,
   F. utilization means responsive to said signals for controlling the movement of said movable arc welding torch means.

8. An arc welding apparatus comprising:
   A. a movable arc welding torch means;
   B. a conical beam generating apparatus comprising:
      (1) means for generating a beam of collimated light;
      (2) a reflective cylinder means having a concave reflective surface;
      (3) motor means having a hollow, rotatable motor shaft;
      (4) beam directing mirror means secured with respect to and rotatable with said hollow rotatable motor shaft for directing said beam of collimated light that passes through said hollow, rotatable motor shaft to said concave reflective surface to produce a conical beam of light having an angular arc that (i) is a function of the radius of the concave reflective surface and the width of the collimated light beam impinging thereon and (ii) illuminates at least a portion of the object to be welded;

C. mounting means for securing said conical beam generating apparatus with respect to said arc welding torch means so that the conical beam generating means moves with the movable arc welding torch means;

D. a replaceable shield means for optically and physically shielding said beam generating apparatus from the welding arc created by said movable arc welding torch means during welding of the object;

E. means for imaging at least part of the light beam illuminated portion of the object to be welded on an array of photosensitive elements to produce corresponding signals; and, F. utilization means responsive to said signals for controlling the movement of said movable arc welding torch means.

9. An arc welding apparatus comprising:

A. a movable arc welding torch means;

B. a conical beam generating apparatus comprising:
  (1) means for generating a beam of collimated light;
  (2) a rotatable reflective cylinder means having a concave reflective surface;
  (3) means for rotating said reflective cylinder means;
  (4) beam directing mirror means secured with respect to and rotatable with said rotatable reflective cylinder means directing said beam of collimated light to said concave reflective surface to produce a conical beam of light having an angular arc that (i) is a function of the radius of the concave reflective surface and the width of the collimated light beam impinging thereon and (ii) illuminates at least a portion of the object to be welded said conical beam generating apparatus being postioned with respect to and movable with said movable arc welding torch means;
  (5) shield means for optically and physically shielding said beam generating apparatus from the welding arc created by said movable arc welding torch means during welding of the object;
  (6) end cap means having an annular bore through which said conical beam of light passes, said end cap means having means for frictionally engaging at least a portion of said shield means so that said shield means can be removed from said end cap means;

C. means for imaging at least part of the light beam illuminated portion of the object to be welded on an array of photosensitive elements to produce corresponding signals; and, D. utilization means responsive to said signals for controlling the movement of said movable arc welding torch means.

10. An arc welding apparatus comprising:

A. a movable arc welding torch means;

B. a conical beam generating apparatus comprising:
  (1) means for generating a beam of collimated light;
  (2) a reflective cylinder means having a concave reflective surface;
  (3) motor means having a hollow, rotatable motor shaft;
  (4) beam directing mirror means secured with respect to and rotatable with said hollow rotatable motor shaft for directing said beam of collimated light that passes through said hollow, rotatable motor shaft to said concave reflective surface to produce a conical beam of light having an angular arc that (i) is a function of the radius of the concave reflective surface and the width of the collimated light beam impinging thereon and (ii) illuminates at least a portion of the object to be welded, said conical beam generating apparatus being positioned with respect to and movable with said movable arc welding torch means;
  (5) shield means for optically and physically shielding said beam generating apparatus from the welding arc created by said movable arc welding torch means during welding of the object;
  (6) end cap means having an annular bore through which said conical beam of light passes, said end cap means having means for frictionally engaging at least a portion of said shield means so that said shield means can be removed from said end cap means;

C. means for imaging at least part of the light beam illuminated portion of the object to be welded on an array of photosensitive elements to produce corresponding signals; and, D. utilization means responsive to said signals for controlling the movement of said movable arc welding torch means.

* * * * *